US009468878B2

(12) United States Patent
Keeling et al.

(10) Patent No.: US 9,468,878 B2
(45) Date of Patent: Oct. 18, 2016

(54) HOT GAS FILTRATION SYSTEM

(71) Applicant: CAMBRIDGE INTERNATIONAL INC., Cambridge, MD (US)

(72) Inventors: Maxwell Lawrence Keeling, Cambridge, MD (US); Melody Elizabeth Fernaays, Arnold, MD (US); Matthew Charles O'Connell, Cambridge, MD (US); Grace Amarachukwu Pokoo Aikins, Mardela Springs, MD (US); George H. Messick, Jr., Cambridge, MD (US); Robert E. Maine, Jr., Salisbury, MD (US)

(73) Assignee: Cambridge International, Inc., Cambridge, MD (US)

( * ) Notice: Subject to any disclaimer, the term of this patent is extended or adjusted under 35 U.S.C. 154(b) by 230 days.

(21) Appl. No.: 14/095,644

(22) Filed: Dec. 3, 2013

(65) Prior Publication Data
US 2014/0230651 A1    Aug. 21, 2014

Related U.S. Application Data

(60) Provisional application No. 61/732,745, filed on Dec. 3, 2012.

(51) Int. Cl.
*B01D 46/00* (2006.01)
*B01D 46/24* (2006.01)

(52) U.S. Cl.
CPC ....... *B01D 46/0065* (2013.01); *B01D 46/2407* (2013.01); *B01D 2273/30* (2013.01)

(58) Field of Classification Search
CPC .......... B01D 46/0065; B01D 46/2407; B01D 2273/30
See application file for complete search history.

(56) References Cited

U.S. PATENT DOCUMENTS

| 4,655,806 | A | * | 4/1987 | Bowersox | .......... | B01D 46/0005 55/302 |
| 5,266,280 | A | * | 11/1993 | Hallett | .................. | B01J 19/123 422/186 |
| 2010/0263536 | A1 | * | 10/2010 | Webb | ..................... | B01D 46/42 95/282 |

* cited by examiner

Primary Examiner — Amber R Orlando
Assistant Examiner — Britanny Precht
(74) Attorney, Agent, or Firm — Buchanan, Ingersoll & Rooney PC

(57) ABSTRACT

A filtration system particularly suited for removing a particulate material from a hot gas includes a housing, a collection system including an array of collection elements, a cleaning system to clean the collected particulate material from the collection elements, and a removal system for removing the collected particulate material from the housing.

18 Claims, 12 Drawing Sheets

HOT GAS FILTRATION SYSTEM

TECHNICAL FIELD

The present invention relates to a hot gas filtration system, more particularly to a hot gas filtration system using an array collection surface to remove particulate material from an air stream, and still more particularly, from a high temperature air stream carrying sticky and/or abrasive particulate.

BACKGROUND

Conventionally, before emitting so-called "industrial waste gases" and/or "process gases", air purification is performed to remove various types of fine particulates contained in the industrial waste gases, such as mist and dust containing sticky and abrasive particulate powders, which pollute the atmosphere, and/or process gases containing similar particulate which could damage process equipment used in the coatings, paint and encapsulation industries, for example.

Previous air stream filtration methods include, for example, electrostatic dust precipitators, cyclone separator systems, and rigid ceramic filters, each of which has suffered from certain drawbacks and inefficiencies. The cleaning of the collection plates in electrostatic precipitators presents a problem inasmuch as a substantial amount of reentrainment of the dust occurs. In cyclone separators, the particulate laden gas is introduced under pressure, and thus vessel pressure and "collapsing pressure" due to pressure loss through the cyclone system are a common cause of concern. Ceramic filter devices on the other hand comprise porous ceramic materials which, when subjected to high temperature corrosive environments, the filter elements can break under the influence of these conditions.

The disclosure herein provides a hot gas filtration system with improved reliability and efficiency, and in particular, a hot gas filtration system capable of filtering air streams that are high temperature and which carry sticky and/or abrasive particulates.

SUMMARY

The disclosure herein provides a filtration system for removing a particulate material, comprising a housing having an internally formed air path communicating between an inlet for incoming polluted air containing particulate material and an air outlet for emitting clean air filtered by removing the particulate material; a collection system provided in the air stream to collect the particulate material, said collection system including an array of collection elements; a cleaning system provided to clean the collected particulate material from the array of collection elements; and a removal system for removing the collected particulate material from said housing.

BRIEF DESCRIPTION OF THE DRAWING FIGURES

These and other objects, features, and advantages of the disclosure will become more readily apparent to those skilled in the art upon reading the following detailed description, in conjunction with the appended drawings in which.

DETAILED DESCRIPTION

Figure 1:
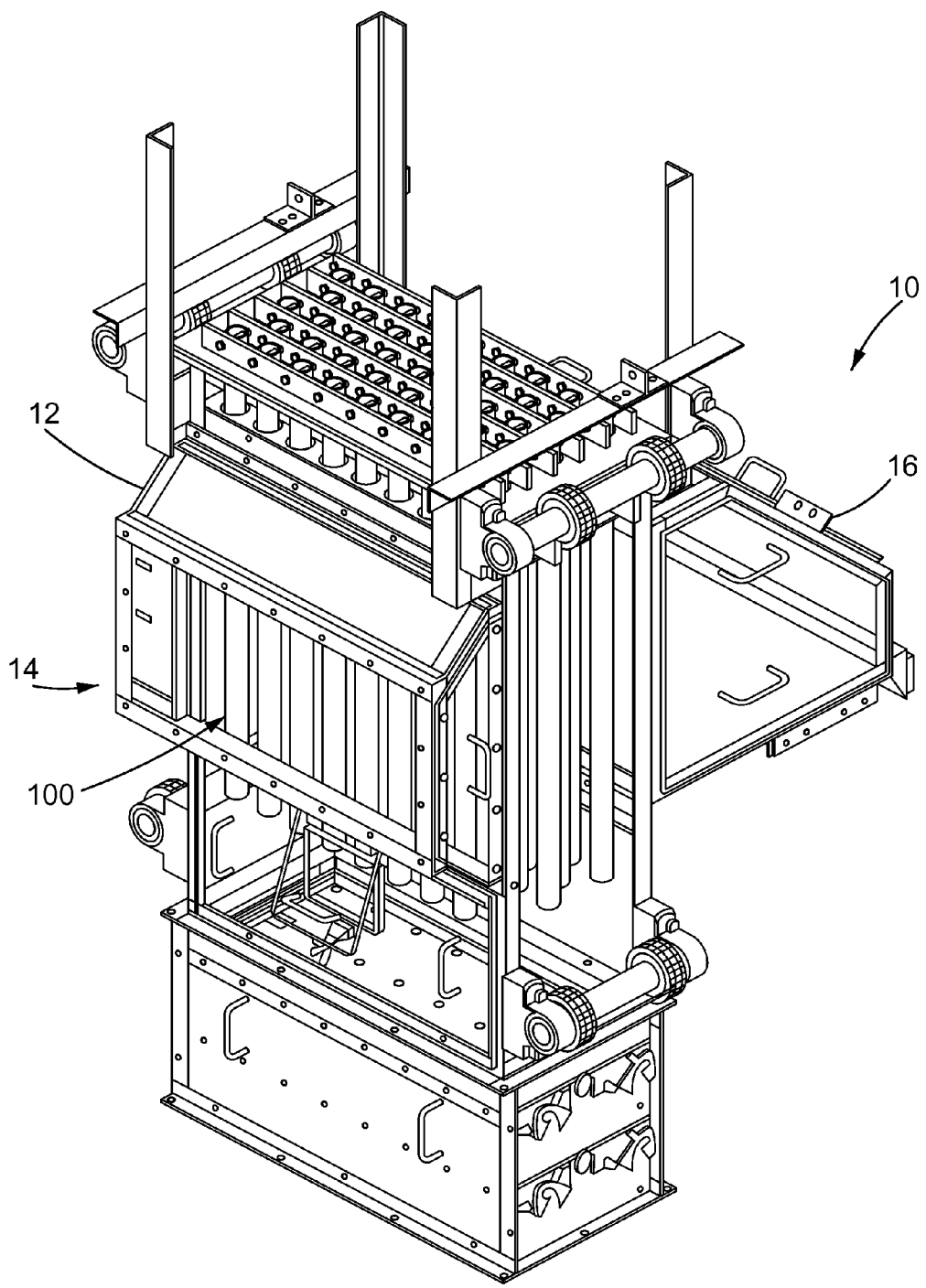
FIG. 1 is a perspective view of a hot gas filtration system according to a first exemplary embodiment of the disclosure, with portions of the housing and drive system removed for clarity.
Figure 2:
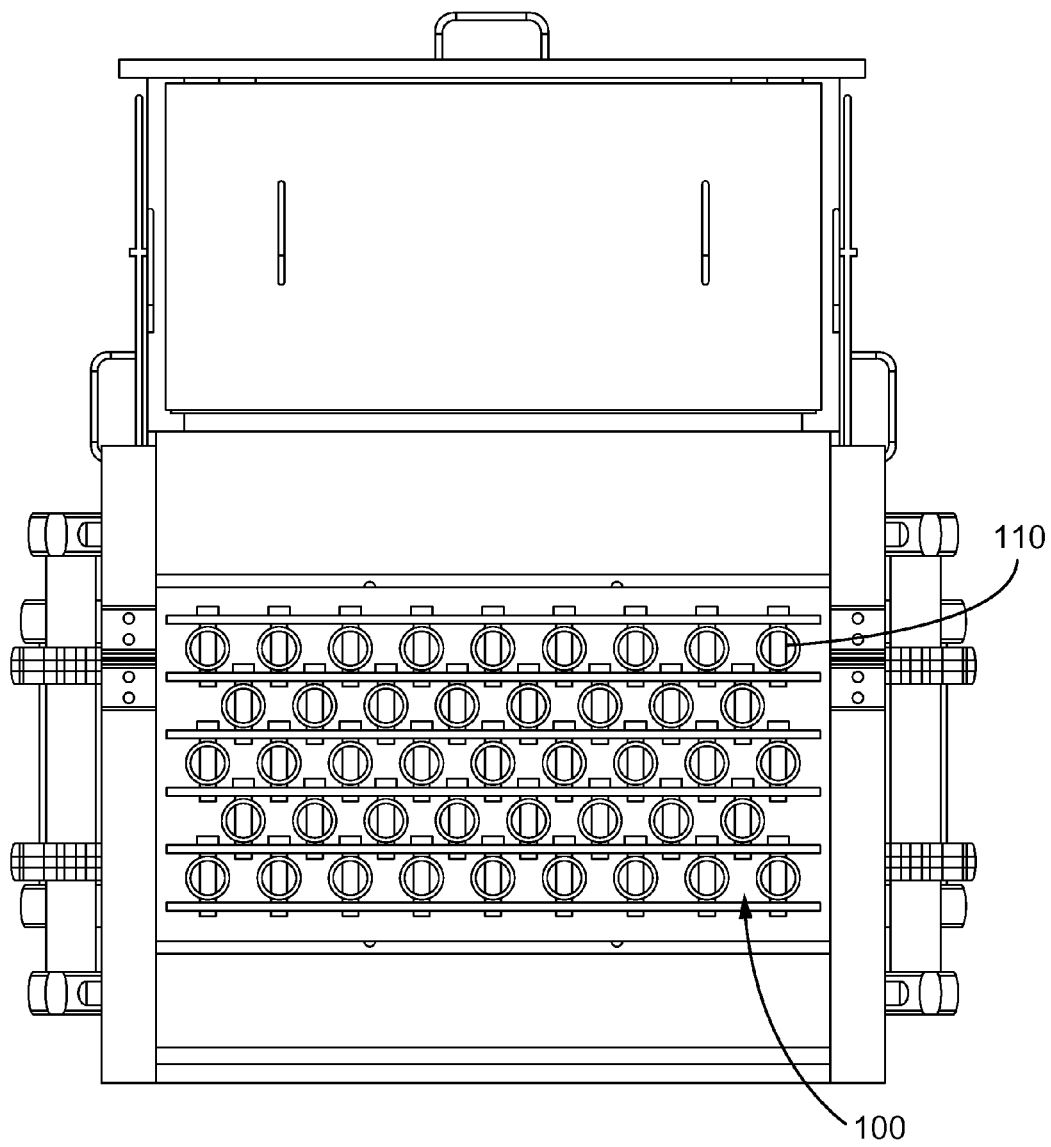
FIG. 2 is a top view of the filtration system shown in FIG. 1.
Figure 3:
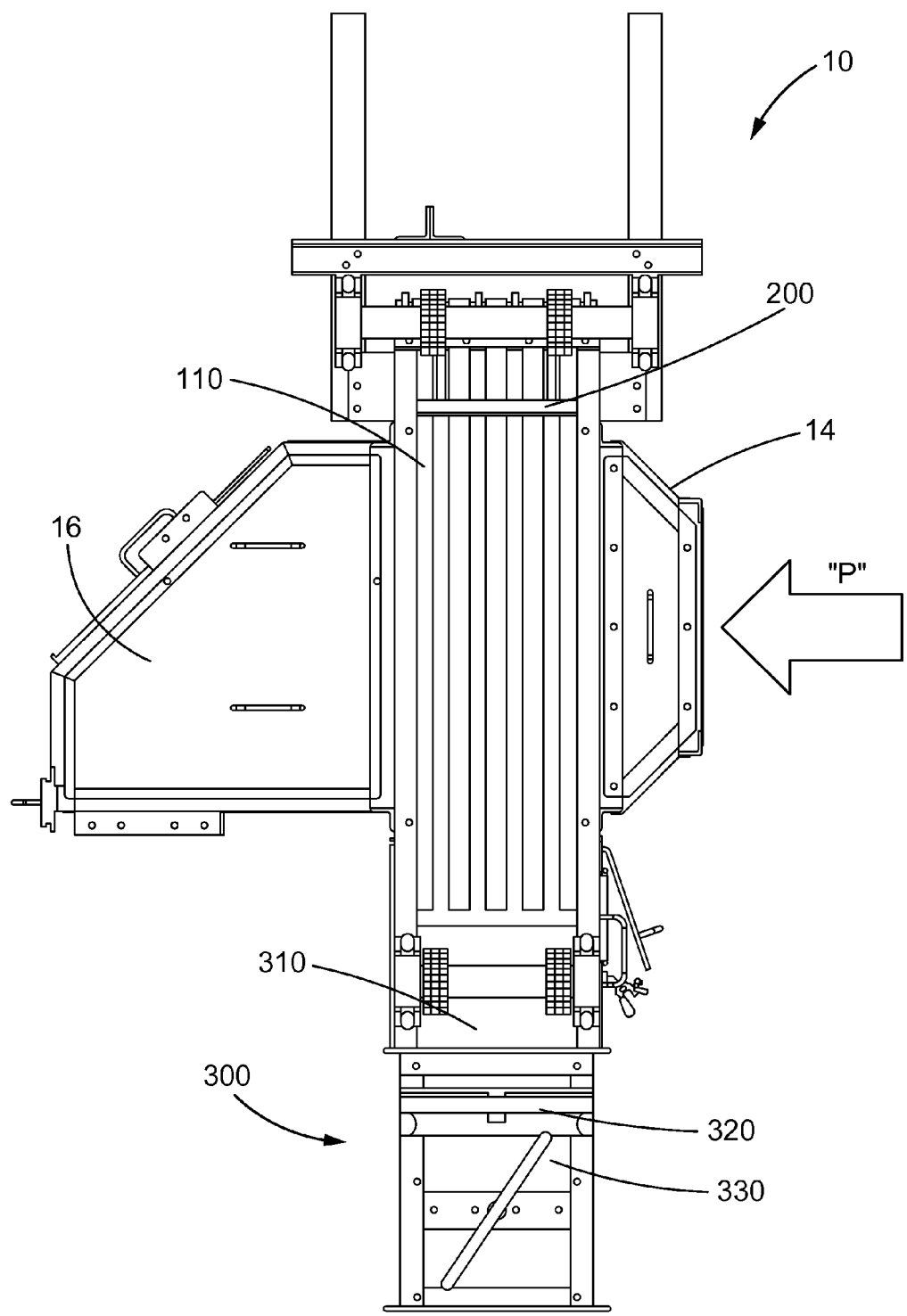
FIG. 3 is a side view of the filtration system shown in FIG. 1.

A filtration system 10 in accordance with a first exemplary embodiment of the disclosure is shown best in FIGS. 1-3. Filtration system 10 is confined within a housing 12 having an air inlet 14 and an air outlet 16. Filtration system 10 includes an array collection system 100 which collects the particulate from the air stream, an array cleaning system 200 to remove the particulate adhered to the array collection system 100, and a clog-resistant airlock 300 allowing removal of the collected particulate from the filtration system 10. The filtration system 10 is particularly suited for use with hot gas or air streams that are high temperature and which carry sticky and/or abrasive particulates.

Figure 4:
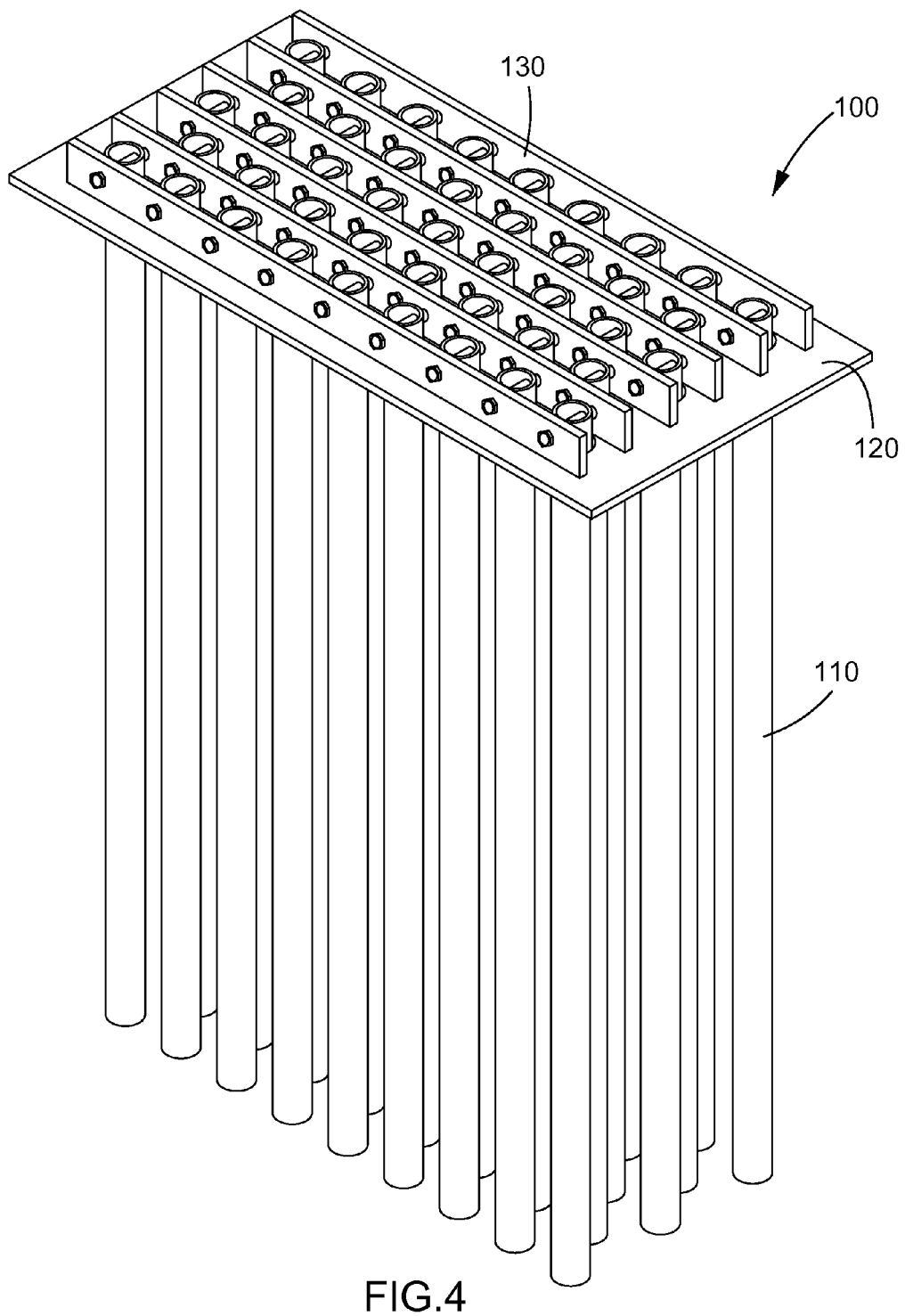
FIG. 4 is a perspective view of the vertical collection system used in the hot gas filtration system shown in FIG. 1.
Figure 5:
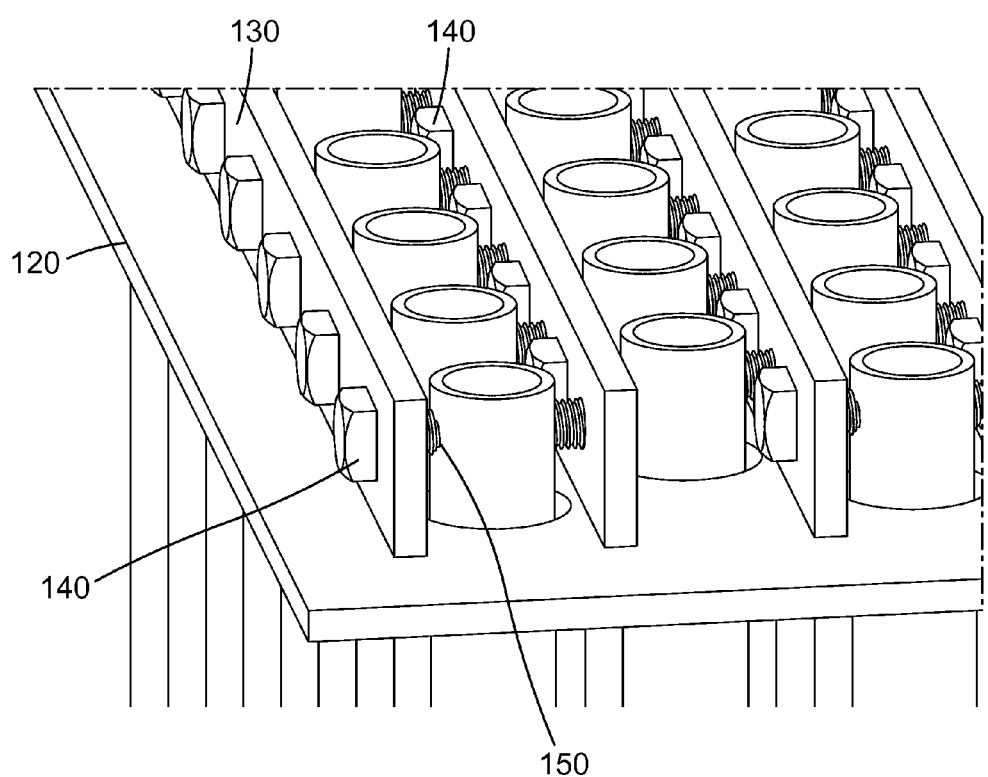
FIG. 5 is an enlarged partial perspective view of the collection system shown in FIG. 4
Figure 6:
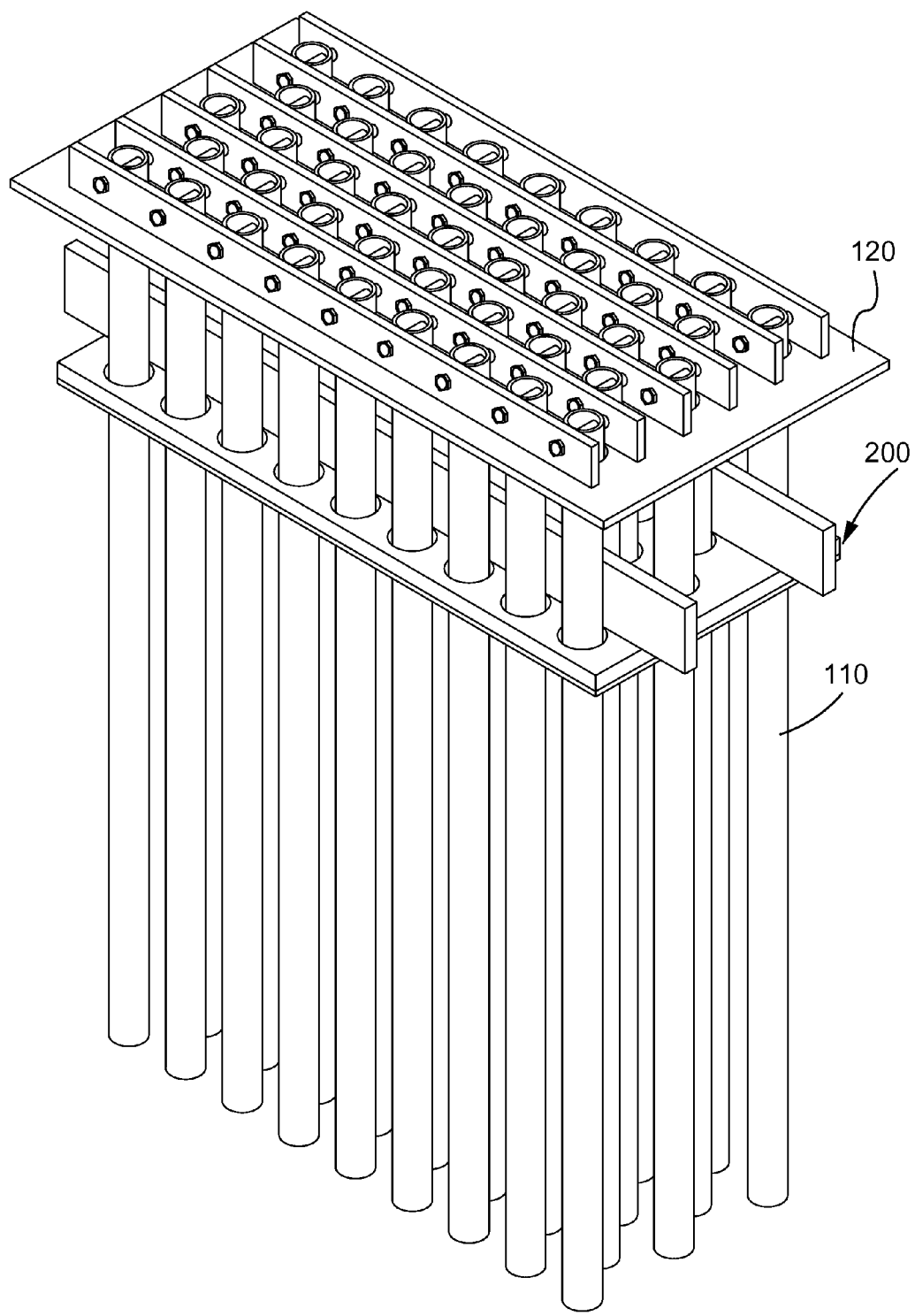
FIG. 6 is a perspective view of the collection system shown in FIG. 4, together with the cleaning system.
Figure 7:
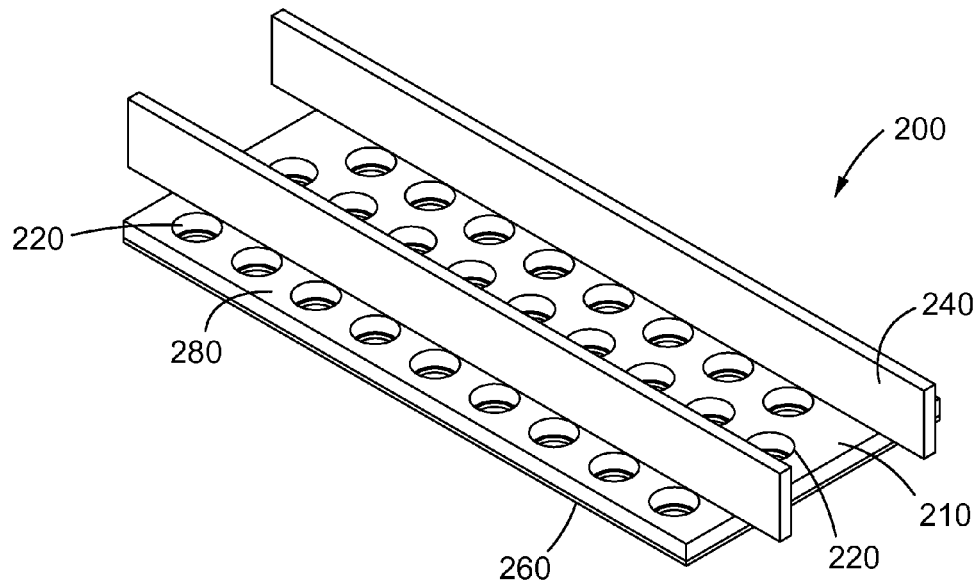
FIG. 7 is a perspective view of the cleaning system shown in FIG. 5.
Figure 8:
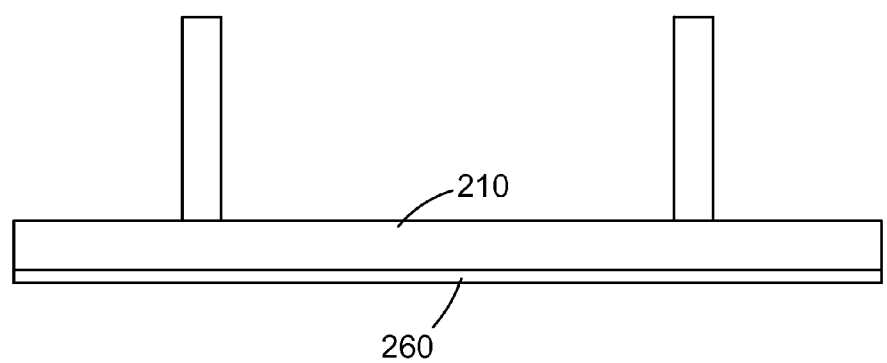
FIG. 8 is a side view of the cleaning system shown in FIG. 7.
Figure 9:
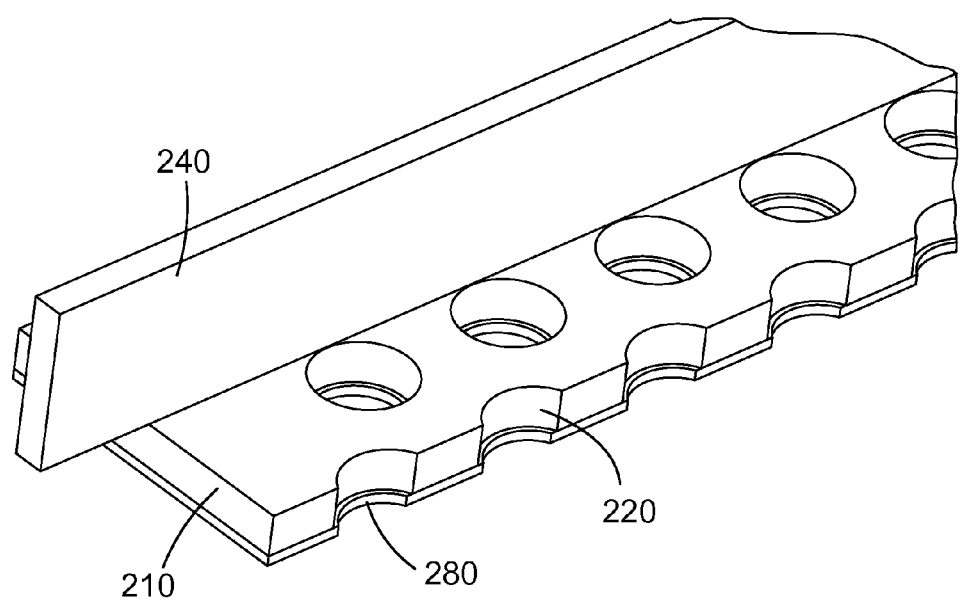
FIG. 9 is an enlarged partial perspective view of the cleaning system shown in FIG. 7.

The air stream flow path "P" enters the filtration system 10 and passes through array collection system 100 comprising a plurality of collection elements 110. Referring also to FIGS. 4 and 5, as illustrated with respect to the first embodiment herein, the collection elements 110 are arranged in a vertical configuration with round cross-sectional tubes defining each of the collection elements 110. The array defined by the collection elements 110 causes the particulate laden airstream "P" to flow through the array of collection elements 110 in a sinuous pattern. Sticky/heavy particulate impacts and adheres to the surfaces of the collection elements 110 and is aided by the centrifugal force of the sinuous air flow pattern. As will be appreciated by one skilled in the art, other array configurations other than the vertically disposed example shown are possible. The length of the collection elements 110 as well as the cross-sectional shape, pattern, depth and width can also be varied depending upon the industry application and particulate characteristics. The creation of a sinuous air stream through the array collection system improves the collection efficiency without dramatically increasing pressure drop across the filtration system. The collection elements 110 are shown, as in FIG. 4, with a smooth outer surface, but it is within the scope of the disclosure herein that they can be textured to aid in the initial capture phase of particulate on system start up.

As best shown in FIGS. 4 and 5, the collection elements 110 are preferably only anchored on one end thereof to a support plate 120. A plurality of mounting bars 130 are arranged on an exterior surface of the support plate 120 and attachment means 140, such as bolts, extend through the mounting bars 130 disposed on opposing sides of each collection element 110 and through-holes 150 provided in each collection element 110. This allows for ease of maintenance of the array cleaning system 200, discussed below, and also improves the cleaning process in the case of very hard to remove build-up.

Referring also to FIGS. 6-9, the array cleaning system 200 includes a plate support structure 210 having reinforcing bars 240 and a plurality of holes or openings 220, and a replaceable die plate 260 having a plurality of holes or openings 280. The plate openings 220 are aligned with the die plate openings 280 in order to allow the collection elements 110 to pass therethrough. The system 200 removes the adhered particulate from the array of collection elements 110 by virtue of a scraping action caused by relative motion between the plate support structure 210 and the die plate 260 along the length of the collection elements 210. Either the array collection system 100 or the array cleaning system 200 may be actuated to achieve this relative motion/scraping action. This may be affected by use of external chain driven systems, hydraulic cylinders or ball screws that are outside of the airstream, although to those familiar with the art it will be clear that other actuation methods can of course also be used. The die plate 260 is designed to be replaceable as it is a component subject to abrasive wear, and thus it can also be made of a harder material then the reinforced plate support structure 210. The size and shape of the holes or openings 280 in the die plate 260 are also slightly larger than the size/shape of the collection elements 110, as tailored to the specific application. The difference in size/shape is intended so that all of the sticky particulate is never completely removed from the collection elements 110 and it thus aids in collecting new incoming particulate. As will be appreciated by one skilled in the art, the plate holes or openings 220 are preferably larger than the openings in the 280 and thus may not necessarily change in size based upon the size of the array elements. Additionally, as mentioned above, the collection elements 110 are preferably only anchored at one end, i.e., at the top of the system 10 to support plate 120 for the illustrated vertical orientation. This allows for easy removal of the die plate 260 for replacement. This anchor design in combination with the oversize die openings 280 also helps break up difficult to remove build-up by allowing the collection elements 110 to slightly angle away from their front faces putting more shear force over a smaller area of the inner surfaces of the holes 280 in the die plate 260.

The filtration system 10 operates in the following manner: the air stream enters the housing 12 and passes through the array collection system 100 in the direction of air flow path "P", thus passing through the collection elements 110 in a sinusoidal pattern. Particulate impacts and adheres to the surfaces of the collection elements 110.

Referring to FIG. 3, removed particulate falls into a collection chamber 310 defined by a clog-resistant airlock 300. The airlock 300 uses a pair of rotating plates 320, 330 to allow collected particulate to be removed from the filtration system 10 while maintaining an air seal from outside the system. The plates 320, 330 rotate sequentially, with at least one in a horizontal position at all times. As each plate 320, 330 rotates, it is near the surface of the other plate 320, 330, thereby scraping off any large particulate buildup adhering to the airlock plates.

Figure 10:
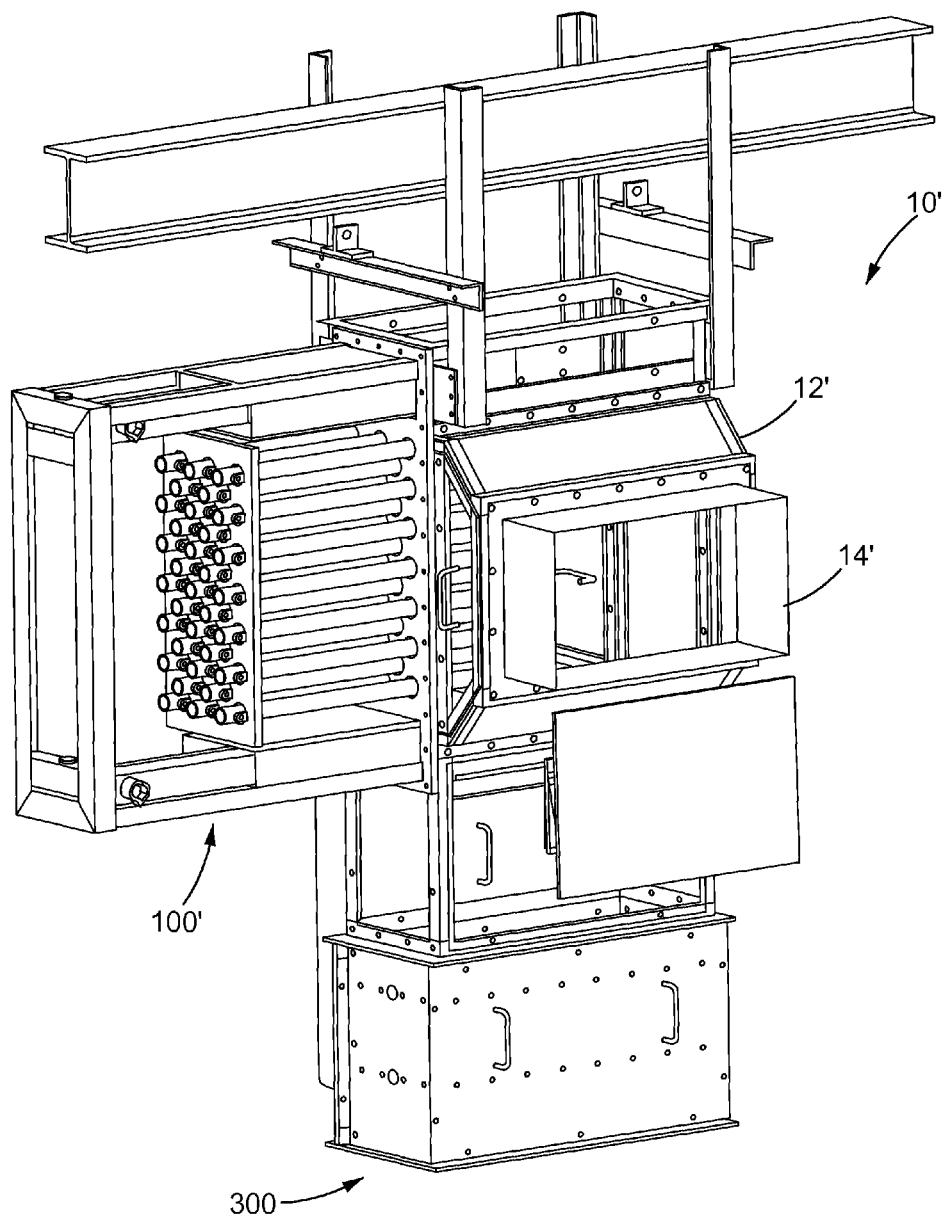
FIG. 10 is a perspective view of a hot gas filtration system according to a second exemplary embodiment of the disclosure, with portions of the housing and drive system removed for clarity.
Figure 11:
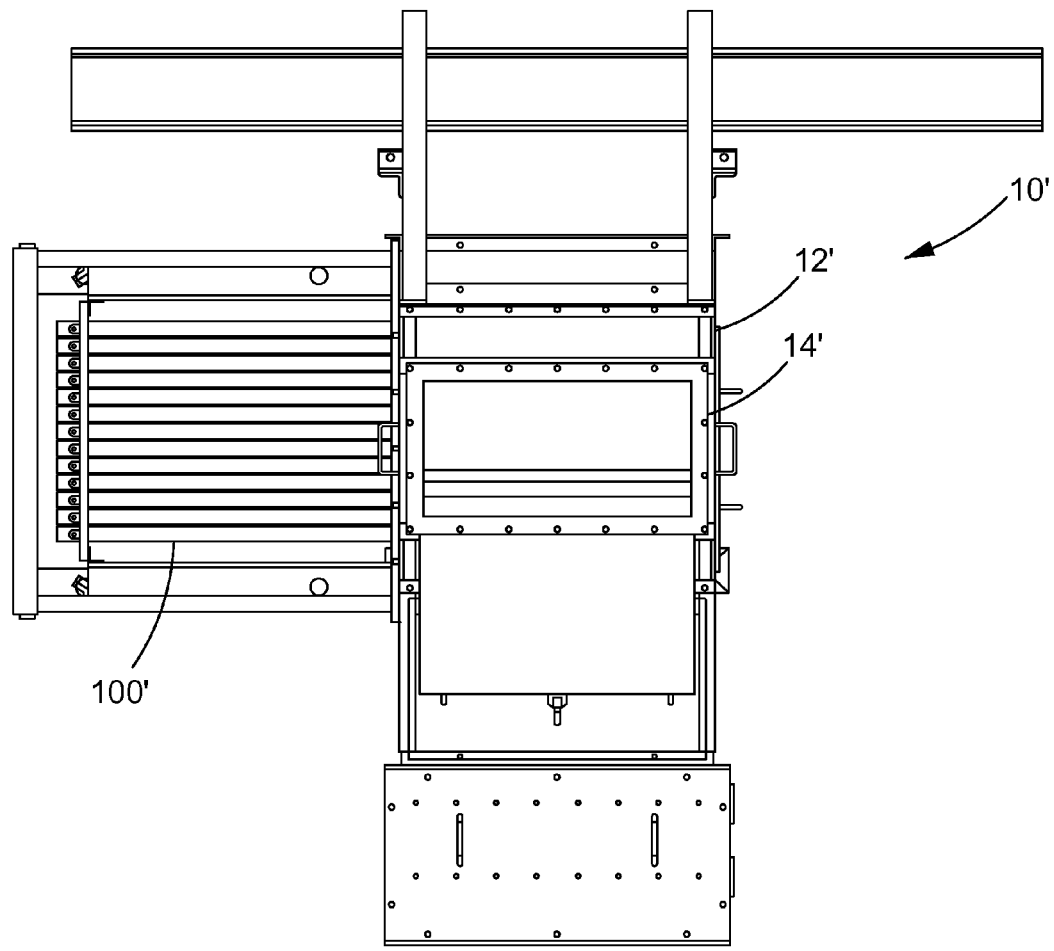
FIG. 11 is a front view of the filtration system shown in FIG. 10.
Figure 12:
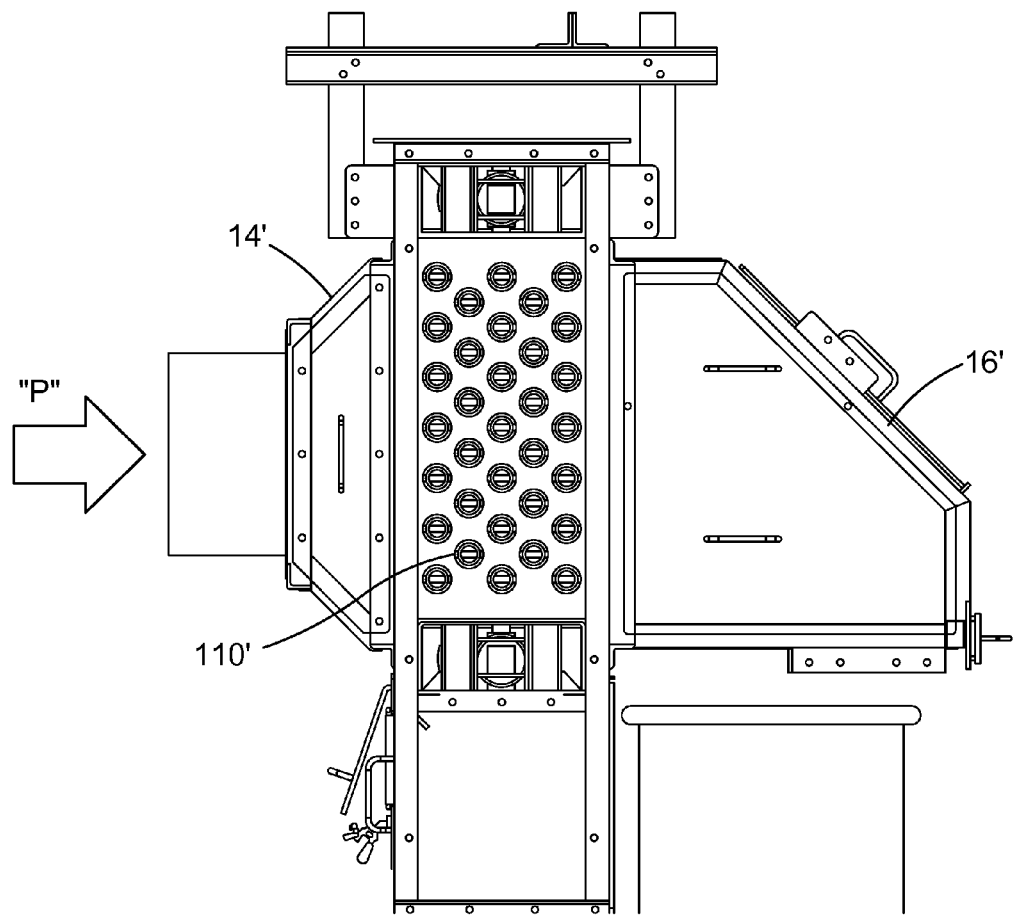
FIG. 12 is a side view of the filtration system shown in FIG. 10.

A filtration system 10' in accordance with a second exemplary embodiment of the disclosure is shown in FIGS. 10-12, with like reference numerals being used to identify like components. Filtration system 10' is confined within a housing 12' having an air inlet 14' and an air outlet 16'. Filtration system 10' includes an array collection system 100' which collects the particulate from the air stream, an array cleaning system 200 to remove the particulate adhered to the array collection system 100', and a clog-resistant airlock 300 allowing removal of the collected particulate from the filtration system 10'.

Figure 13:
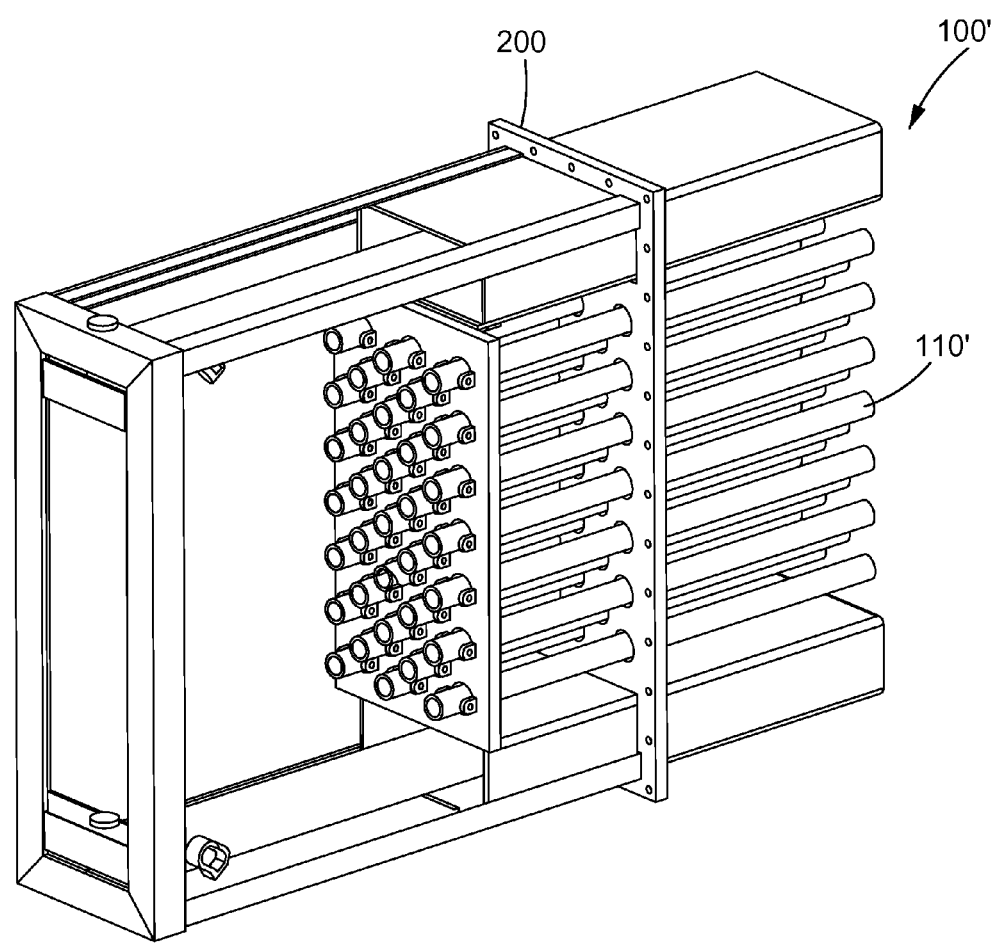
FIG. 13 is a perspective view of the horizontal collection system used in the hot gas filtration system shown in FIG. 10.

As shown in FIG. 12, the air stream flow path "P" enters the filtration system 10 and passes through array collection system 100' comprising a plurality of collection elements 110'. As illustrated with respect to the second embodiment disclosed here, the collection elements 110' are arranged in a horizontal configuration with round cross-sectional tubes defining each of the collection elements 110'. The array defined by the collection elements 110' also causes the particulate laden airstream "P" to flow through the array of collection elements 110' in a sinuous pattern. Sticky/heavy particulate impacts and adheres to the surfaces of the collection elements 110' and is aided by the centrifugal force of the sinuous air flow pattern. As will be appreciated by one skilled in the art, other array configurations other than the horizontally disposed example shown are possible. The length of the collection elements 110' as well as the cross-sectional shape, pattern, depth and width can also be varied depending upon the industry application and particulate characteristics. The creation of a sinuous air stream through the array collection system improves the collection efficiency without dramatically increasing pressure drop across the filtration system. The collection elements 110' are shown, as in FIG. 13, with a smooth outer surface, but it is within the scope of the disclosure herein that they can be textured to aid in the initial capture phase of particulate on system start up.

The unique self-cleaning abilities of the internal components of the filtration system 10, 10' thereby allow it to operate continuously in air streams that would clog or damage other types of filtration systems, i.e., air streams that are high temperature and which carry sticky and/or abrasive particulates.

Although certain preferred embodiments of the disclosure herein have been shown and described in detail, it should be understood that various changes and modifications may be made therein without departing from the scope of the appended claims.

What is claimed is:
1. A filtration system for removing a particulate material, comprising:
  a housing having an internally formed air stream flow path communicating between an inlet for incoming polluted air containing particulate material and an air outlet for emitting clean filtered air from which the particulate material has been removed;
  a collection system provided in the air stream flow path to collect the particulate material, said collection system including a support plate and an array of collection elements anchored at one end to the support plate and to which the particulate material adheres when the air stream flow path passes through said collection system;
  a cleaning system provided to clean the collected particulate material from the array of collection elements; and a removal system for removing the collected particulate material from said housing;

wherein said cleaning system comprises a plate support having a plurality of plate openings and a die plate having a plurality of die openings, said die plate being immediately adjacent said plate support, said plate openings and the die openings being aligned so as to allow the collection elements to pass therethrough;

at least one of the support plate and the cleaning system configured to be movable such that said plate support and said die plate move together relative to said collection elements, thereby scraping adhered particulate from said collection elements.

2. The filtration system according to claim 1, wherein said plurality of collection elements comprise a plurality of round cross-sectional tubes.

3. The filtration system according to claim 1, wherein said plurality of collection elements are arranged such that the air stream flow path defines a sinuous pattern through said plurality of collection elements.

4. The filtration system according to claim 1, wherein said plate openings are larger than the die openings.

5. The filtration system according to claim 1, wherein said removal system comprises a collection chamber defined by an airlock.

6. The filtration system according to claim 5, wherein said airlock comprises a pair of rotating plates.

7. The filtration system according to claim 1, wherein said plurality of collection elements are vertically disposed within said housing.

8. The filtration system according to claim 1, wherein said plurality of collection elements are horizontally disposed within said housing.

9. A method for filtering particulate material from an air stream comprising:
   passing an incoming air stream containing particulate material along a flow path within a housing;
   providing a collection system including a support plate and a plurality of collection elements anchored at one end to the support plate;
   collecting the particulate material from the air stream in the collection system, whereby particulate material adheres to the plurality of collection elements when the air stream passes through the collection system;
   providing a plate support and an immediately adjacent die plate, the plate support having a plurality of plate openings and the die plate having a plurality of die openings, and aligning the plate openings and the die openings so as to allow the collection elements to pass therethrough;
   cleaning the collected particulate material from the plurality of collection elements; said cleaning step comprising moving the plate support and the die plate together along a length of the collection elements and thereby scraping adhered particulate material from the collection elements;
   emitting clean filtered air from which the particulate material has been removed; and
   removing the collected particulate material from the housing.

10. The method according to claim 9, wherein said passing step includes passing the air stream along a sinuous pattern through the plurality of collection elements.

11. The method according to claim 9, further comprising providing a collection chamber defined by an airlock having a pair of rotating plates, wherein said removing step comprises rotating the pair of rotating plates sequentially and thereby removing the particulate material from the housing while maintaining an air seal.

12. The filtration system according to claim 1, wherein the die plate is removable from the plate support.

13. A filtration system for removing a particulate material, comprising:
   a housing having an internally formed air stream flow path communicating between an inlet for incoming polluted air containing particulate material and an air outlet for emitting clean filtered air from which the particulate material has been removed;
   a collection system provided in the air stream flow path to collect the particulate material, said collection system including a support plate and an array of collection elements anchored at one end to the support plate and to which the particulate material adheres when the air stream flow path passes through said collection system;
   a cleaning system provided to clean the collected particulate material from the array of collection elements; and
   a removal system for removing the collected particulate material from said housing;
   wherein said cleaning system comprises a plate support having a plurality of plate openings and a die plate having a plurality of die openings, said plate openings and the die openings being aligned so as to allow the collection elements to pass therethrough, said plate support and said die plate being configured to be movable along a length of said collection elements, thereby scraping adhered particulate from said collection elements;
   wherein the die plate is removable from the plate support; and
   wherein the die plate is formed from a first material and the plate support is formed from a second material, the first material being different from the second material.

14. The filtration system according to claim 13, wherein said plurality of collection elements comprise a plurality of round cross-sectional tubes.

15. The filtration system according to claim 13, wherein said plurality of collection elements are arranged such that the air stream flow path defines a sinuous pattern through said plurality of collection elements.

16. The filtration system according to claim 13, wherein said plate openings are larger than the die openings.

17. The filtration system according to claim 13, wherein said removal system comprises a collection chamber defined by an airlock.

18. The filtration system according to claim 17, wherein said airlock comprises a pair of rotating plates.

* * * * *